(No Model.)

C. D. WATKINS.
NUT LOCK.

No. 458,083. Patented Aug. 18, 1891.

WITNESSES:
A. J. Schwartz
W. H. Lochrey.

Clinton D. Watkins
INVENTOR

BY
W. T. Fitzgerald
ATTORNEYS

UNITED STATES PATENT OFFICE.

CLINTON D. WATKINS, OF MORROW, OHIO.

NUT-LOCK.

SPECIFICATION forming part of Letters Patent No. 458,083, dated August 18, 1891.

Application filed January 23, 1891. Serial No. 378,834. (No model.)

*To all whom it may concern:*

Be it known that I, CLINTON D. WATKINS, a citizen of the United States, residing at Morrow, in the county of Warren and State of Ohio, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks; and it consists of certain novel features of construction and arrangement, which will be hereinafter described and claimed, reference being had to the accompanying drawings, in which—

Figure 1:
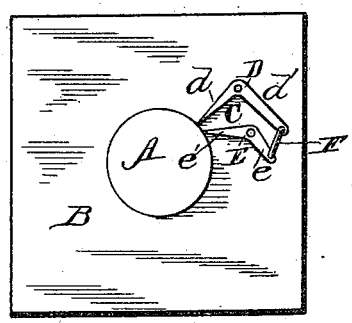
Figure 2:
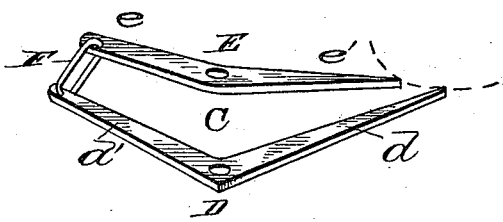

Figure 1 is a top plan view. Fig. 2 is a detail of the locking-pawls.

Referring to the several parts by letters of designation, A is the bolt, and B is the nut, of the usual or any preferred construction, and upon the outer face of the latter I mount the locking device or pawl C, as shown, the locking-pawl C consisting of the parts D and E, both formed of sheet metal, the former having the pointed arms $d$ and $d'$, arranged at right angles to each other, while the latter consists of similarly-formed arms $e$ and $e'$, arranged to form an acute angle, as shown. The arms $d'$ and $e$ are joined together by the link F, as shown in Figs. 1 and 2. The pawls D and E are loosely mounted upon pivots on the outer or upper side of the nut, so that the arm $d$ will come lightly in contact with the bolt, while the pawl E is so placed that its arm $e'$ will come squarely in contact with the bolt. By thus mounting the said pawls the arm $d$ will be caught by the periphery of the bolt and caused to move with it, thereby forcing the longer arm $e'$ squarely in contact with the bolt, and as such arm is sharply pointed and too long to swing past the bolt it will impinge between the threads of the bolt and securely lock the nut against reverse rotation.

It will be seen from the foregoing description that I have produced an efficient nut-locking device, and believing that its advantages and operation will be readily understood further description is deemed unnecessary.

Having thus described my invention, what I claim, and desire to secure by Letters Patent, is—

1. A nut-lock herein described and shown, consisting of the pawls D and E, pivotally connected by the link and pivotally secured to the outer surface of the nut, so that the arm $d$ will lightly come in contact with the bolt and thus force the arm $e'$ sharply against the bolt and thus prevent reverse rotation of the nut, as set forth.

2. The combination of the nut, the bolt adapted to receive the same, the linked pawls pivotally mounted on the outer face of the nut and adapted to act in connection with each other, and formed, respectively, with the arms $d\ d'$ and $e\ e'$, substantially as described, and for the purpose named.

In testimony whereof I affix my signature in presence of two witnesses.

CLINTON D. WATKINS.

Witnesses:
 MILTON CLARK,
 ALBERT ANDERSON.